Oct. 19, 1926.

M. C. SCROTE

TIRE BUILDING APPARATUS

Filed March 17, 1923 4 Sheets-Sheet 3

Inventor
Merle C. Scrote.
By Robert McPierson
Atty.

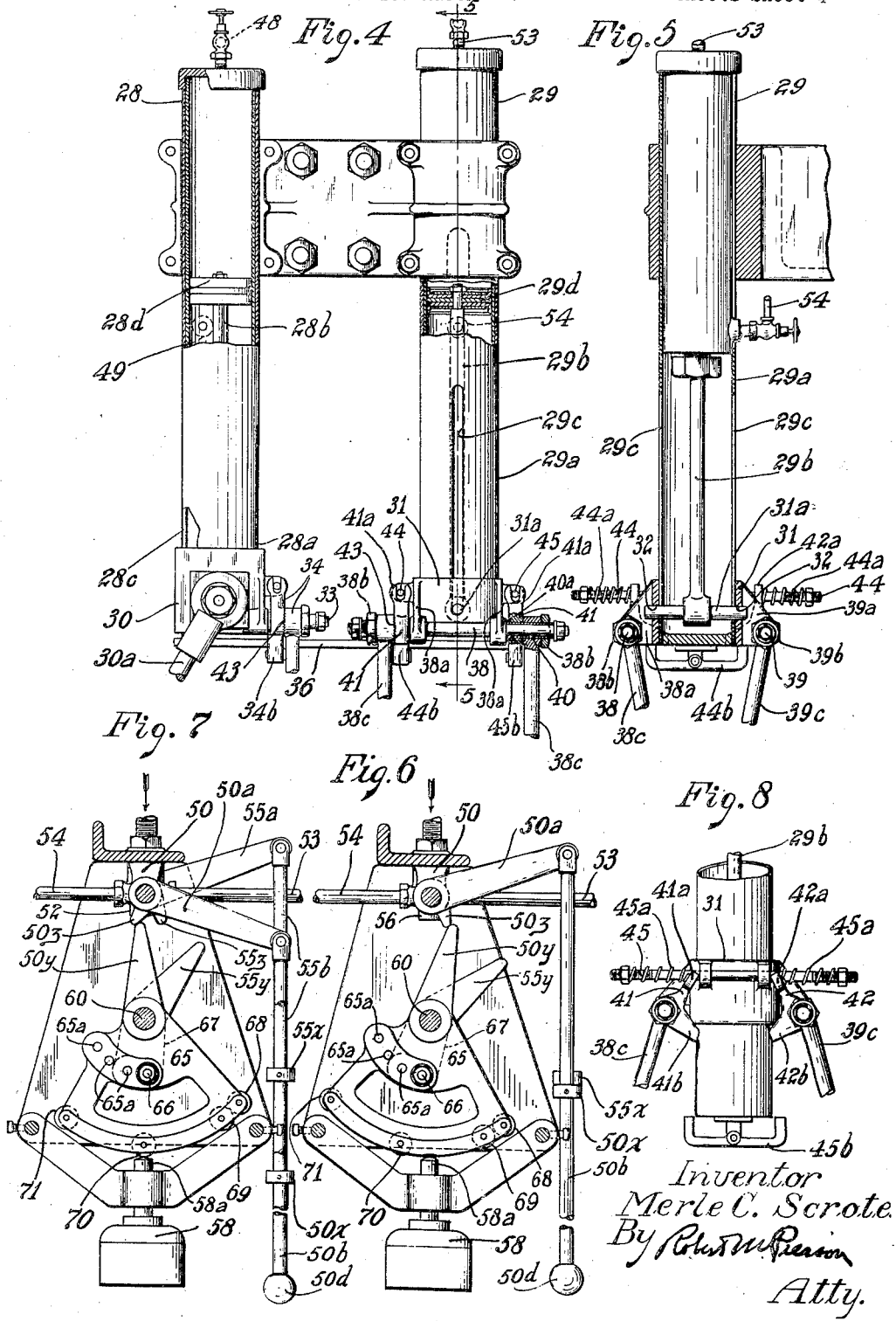

Patented Oct. 19, 1926.

1,603,988

UNITED STATES PATENT OFFICE.

MERLE C. SCROTE, OF AKRON, OHIO, ASSIGNOR TO THE B. F. GOODRICH COMPANY, OF NEW YORK, N. Y., A CORPORATION OF NEW YORK.

TIRE-BUILDING APPARATUS.

Application filed March 17, 1923. Serial No. 625,689.

This invention relates to apparatus for building pneumatic tire casings, wherein the casing is formed of rubberized fabric drawn onto a revolving tire core and the successive plies thereof are shaped laterally about the core and pressed in place by tire tools or discs running upon the work.

The general objects of my invention are to provide improved means for supporting the tools and for presenting them quickly and accurately to the work, for applying them to the work with the desired pressure, and for quickly retracting them and holding them in an inoperative position, out of the way of the operator, when not in use. Further objects are to provide such means adapted to retract different members of the set of tools in determinate relation as to time, with respect to the rotation of the tire building core.

Of the accompanying drawings:

Fig. 3 is a rear elevation of the same, with parts broken away and parts in section.

Fig. 4 is a front elevation of a pair of vertical fluid pressure cylinders and associated parts for presenting and retracting the tire tools, parts being broken away and parts in section.

Fig. 5 is a vertical section through one of the cylinders, on line 5—5 of Fig. 4.

Fig. 6 is a horizontal section on line 6—6 of Fig. 2, showing timing mechanism at one stage of operation.

Fig. 7 is a similar section showing the same at another stage.

Fig. 8 is a fragmentary elevation, from the right of Fig. 1, of a tool-arm mounting and associated parts.

Figure 1:
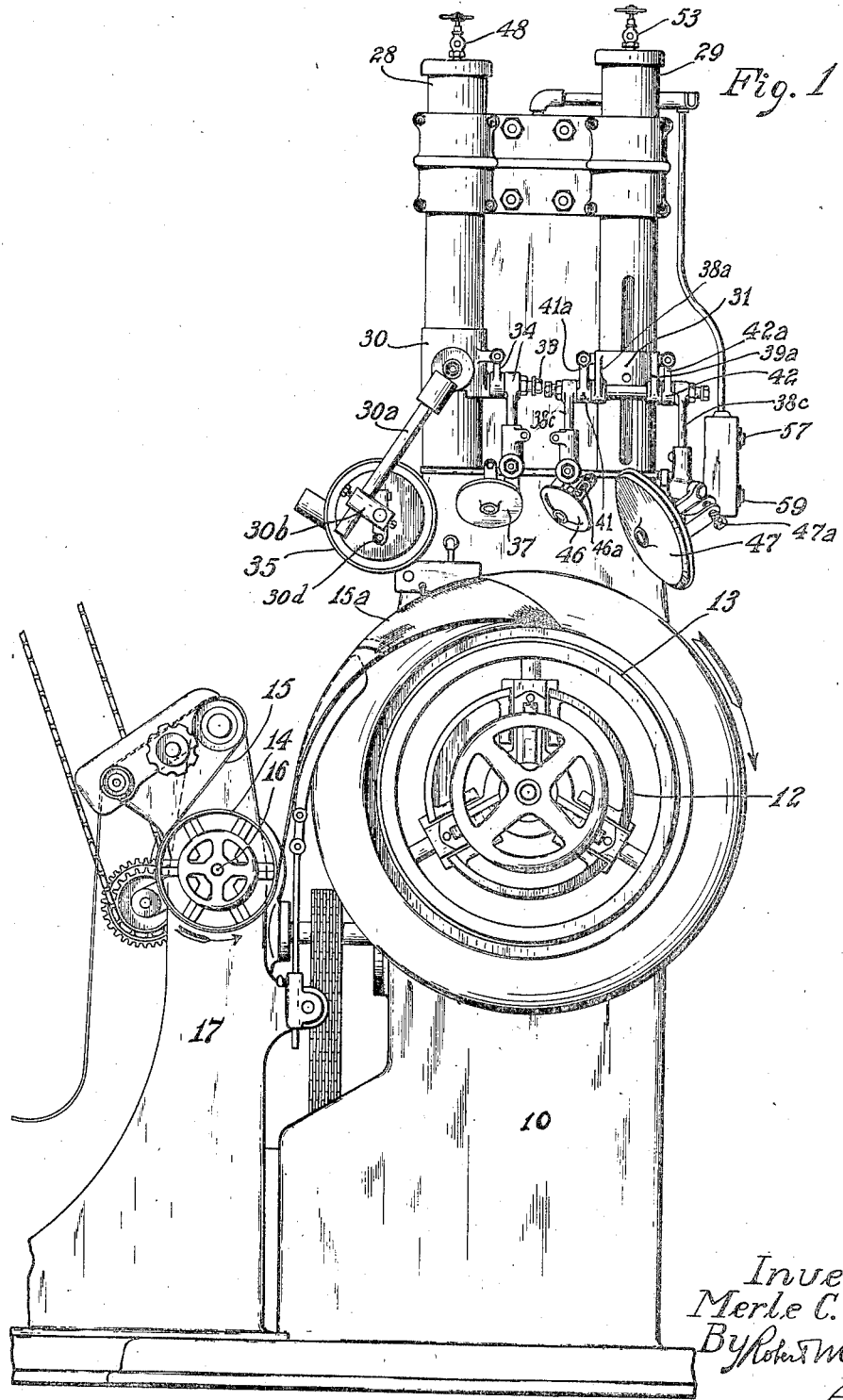
Fig. 1 is a front end elevation of a tire-building machine embodying a preferred form of my invention.

Referring to the drawings, 10 is the main casting or frame of a tire-building machine, in which is journaled a core-supporting shaft 11 provided at its front end with a chuck 12 adapted to have mounted thereon a tire-core 13. The chuck here shown is of the general type described in U. S. Patent No. 1,285,928 of November 26, 1918, to J. L. Butler. 14 is a fabric-tensioning or hold back roll adapted to impart a determinate percentage of stretch to the fabric, 15, as the latter, made up in a continuous strip in which tire units of fabric alternate with fabric "leaders" such as $15^a$, passes to the tire core. Said roll 14 is secured on a shaft 16 journaled in a standard 17, and said shaft 16 is operatively connected with the core-supporting shaft 11, at the rear of the machine (Fig. 3), by worm gears 18, 19 upon said shafts 16 and 11 respectively, the gear 18 being secured upon its shaft and the gear 19 being provided with a clutch mechanism $19^a$, and said gears being meshed respectively with worms 20, 21 secured upon a transverse shaft 22 mounted in the frame 10 and standard 17, the gear ratio being such as to compel the fabric-stretching drum 14 to move at a lower peripheral speed than the core 13. 23 is an electric motor having driving connection with the shaft 22, through a link belt 24, for driving the core, and provided with an automatic, magnetic brake $23^a$, adapted to function whenever the motor circuit is broken, to promptly stop the said motor and the mechanisms driven thereby.

Mounted upon the standard 17 are devices, which need not be specifically described herein, for guiding and laterally forming the fabric 15 as the latter passes onto the core, and for driving the delivery roll of a festooning rack (not shown), from which the fabric is supplied.

Figure 2:
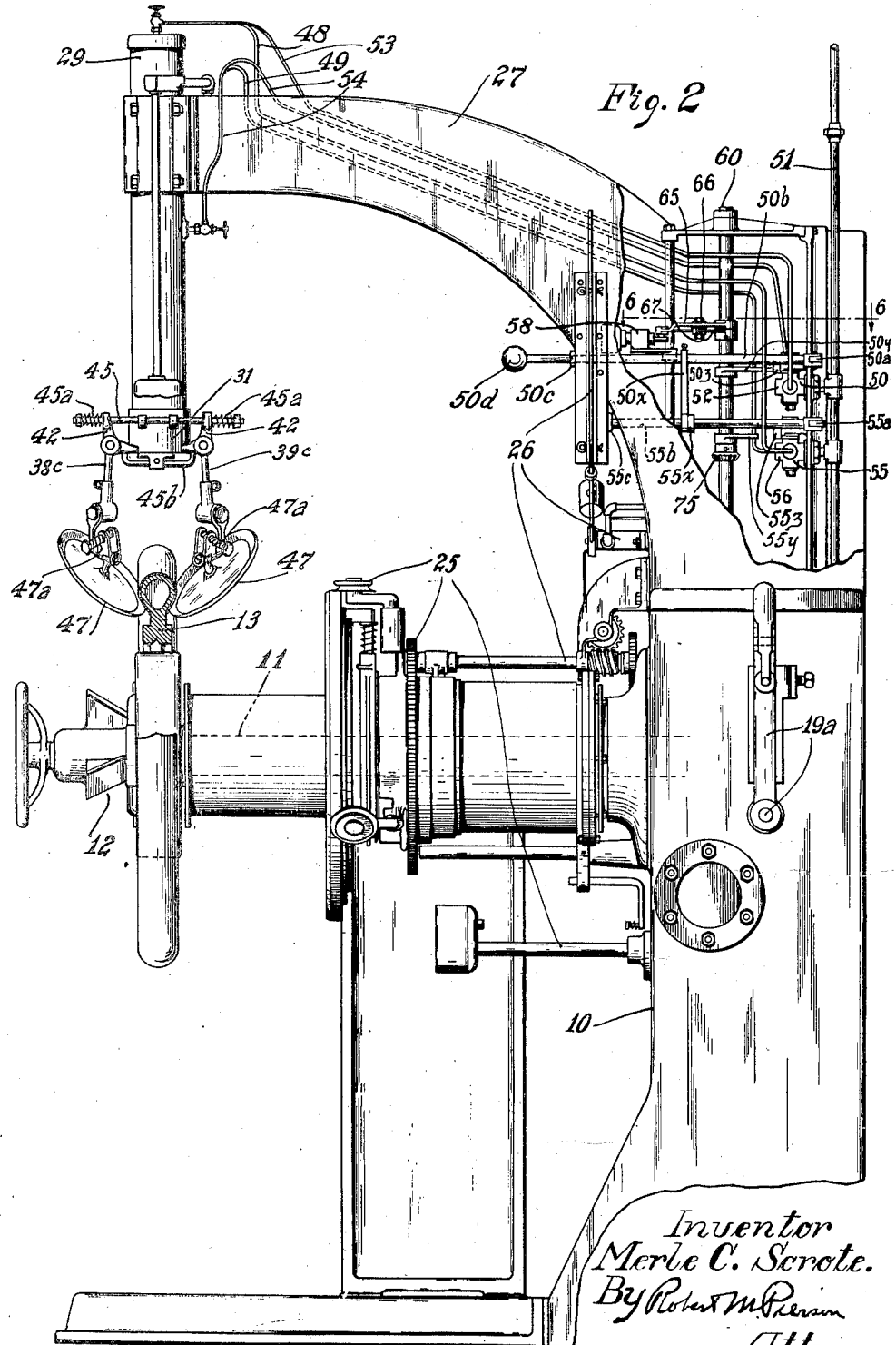
Fig. 2 is a side elevation of the same, from the right of Fig. 1, parts being broken away and parts in section.

In Figs. 2 and 3 are shown a bead setting device 25 and driving and stopping mechanism 26 therefor, which are described in the copending application of John R. Gammeter, Serial No. 606,382, filed December 12, 1922.

Coming now to the parts of the machine which embody my invention, the frame 10 is provided at its top with a large, hollow bracket 27 extending over the tire core 13 and having clamped to its outer end a pair of vertical fluid pressure cylinders 28, 29, each of said cylinders comprising an outer casing, $28^a$, $29^a$ (Figs. 4 and 5), extending downward beyond the cylinder proper and constituting a guide member for the piston rod, $28^b$, $29^b$, and for a tool-carrying, annular, bracket-member or tool-carriage, 30, 31, slidably mounted upon the casing or guide member, the piston rod, $28^b$, $29^b$, having secured at its end a cross-bar, that for the piston rod $29^b$ being shown at $31^a$, slidably projecting through vertical slots, $28^c$, $29^c$, $29^c$, at opposite sides of the casings and into apertures formed in the respective bracket members or tool carriages 30, 31, as shown clearly at 32, 32 (Fig. 5). 28ᵈ, 29ᵈ, are the respective pistons secured upon the piston rods 28ᵇ, 29ᵇ, within the cylinders 28, 29.

Secured upon the tool carriage 30, at opposite sides thereof, are a pair of arms, 30ᵃ, 30ᵃ, extending downward and toward the source of fabric supply, approximately parallel with the plane of the core 13, and mounted on blocks 30ᵇ, 30ᵇ adjustably secured on said arms are fabric "stitching" disks or tire tools 35, 35, backed by springs, such as 30ᵈ, said tools being adapted to operate upon the fabric near the the crown of the core when the carriage 30 is lowered, and to be held downward upon the work by the force of the fluid pressure cylinder 28.

Pivoted respectively upon a pair of stud bolts projecting horizontally from the carriage 30, parallel with the plane of the tire core, one of said stud bolts being shown at 33 (Figs. 1 and 4), are a pair of spring-backed, downwardly extending, tool-arm structures, one being shown at 34, the arrangement being such, as will presently be described with relation to similar structures on the carriage 31, that the tool-carrying lower ends of said tool-arm structures are yieldingly held apart when the carriage 30 is above its lowermost or operative position, but are forced toward each other, to press their tools against the work, when in their lowermost position, by contact of suitable lever arms, laterally projecting therefrom, with a U-shaped stop member 34ᵇ (Fig. 4) pivoted on an ear projecting on the under side of a horizontal plate 36 secured to the lower ends of and bridging the space between the downwardly extended cylinder casings 28ᵃ, 29ᵃ. The tire tool on the nearer of the two tool-arm structures is shown at 37 (Fig. 1), and said tools are backed by springs such as are shown at 47ᵃ (Fig. 2), with respect to the tools 47, for increasing their resilience in contact with the work.

On the carriage 31 associated with the cylinder 29, the stud bolts, 38, 39, horizontal and parallel with the plane of the tire core, project at both ends from the carriage and each is secured in a pair of brackets 38ᵃ, 38ᵃ, 39ᵃ, formed on the carriage. On each projecting end portion of each of the two stud bolts is rotatably mounted a sleeve or bushing such as is shown at 40 (Fig. 4), formed with an external end flange 40ᵃ rotatably abutting the adjacent bracket portion 38ᵃ or 39ᵃ of the carriage. Mounted upon said sleeve and clamped between said end flange and a nut such as 38ᵇ or 39ᵇ threaded upon the outer end of the sleeve are the hub-portions of, first, a bell-crank lever such as 41 or 42, having an upwardly extending, forked arm 41ᵃ or 42ᵃ and an inwardly projecting contact or actuating arm 41ᵇ or 42ᵇ, and, second, a downwardly extending tool arm such as 38ᶜ, 39ᶜ, the abutting faces of the hub portions of said bell-crank lever and said tool arm being formed with radial corrugations, as indicated at 43 (Fig. 4), to prevent relative rotary movement.

Mounted upon the carriage 31 over the stud bolts 38, 39, transverse thereto and at respective sides of the carriage, are a pair of horizontal spring posts, 44, 45, their end portions projecting through the forks of the adjacent bell-crank arms 41ᵃ, 42ᵃ and being provided beyond said forks with respective compression springs 44ᵃ, 44ᵃ, 45ᵃ, 45ᵃ, adapted yieldingly to urge the tool-arms, 38ᶜ, 39ᶜ, of each pair apart. The inwardly extending arms 41ᵇ, 42ᵇ, of each pair of bell-crank levers, are adapted to abut a U-shaped stop member 44ᵇ, or 45ᵇ, pivoted on ears projecting downward from the horizontal plate 36, when the carriage 31 is in its lowermost position, to force the tool arms, 38ᶜ, 39ᶜ, of each pair, toward the work.

On the lower ends of the tool arms 38ᶜ, 39ᶜ are mounted, preferably, as shown, in a manner to permit universal adjustment, loosely-journaled tire tools such as 46, 47, adapted to operate upon the under-the-bead plies and at positions near the base of the tire core, and provided with springs, such as 46ᵃ, 47ᵃ to increase their resilience in contact with the work.

For actuating the cylinder 28, compressed-air pipes 48, 49 lead into the top and bottom thereof respectively, from a four-way valve 50 (Fig. 2) mounted in the hollow bracket 27, connected with a fluid supply line 51, and provided with an exhaust nipple 52. For actuating the cylinder 29, pipes 53, 54 lead respectively into the top and bottom thereof from a four-way valve 55 mounted in said hollow bracket, connected with the supply line 51, and provided with an exhaust nipple 56.

Mechanism is provided for starting and stopping the core-driving motor 23 and actuating the tool-mounting cylinders 28, 29 in determinate relation so that when the under-the-bead plies have been pressed against the core by the tools 46, 47, the latter will be automatically raised to their inoperative position to permit the placing of the beads, and subsequently to permit the pressing of the over-the-bead plies, in that region, by another mechanism, such, for example, as is described in my copending application Serial No. 619,648, filed February 17, 1923, Patent Number 1,592,871, July 20, 1926.

The motor 23 is provided with a three wire remote-control comprising a normally open push-button starting switch 57 (Figs. 1 and 3), within the operator's reach, a normally closed automatic stopping switch 58 (Figs. 2, 6 and 7), mounted in the hollow bracket 27, a normally closed emergency push-button stopping switch 59 (Figs. 1 and 3), mounted adjacent the starting switch 57, and the usual associated elements (not shown), the arrangement being such that the momentary closing of the starting switch 57, although the stopping switch 58 may be held open by mechanism presently to be described, starts the core-driving motor 23, which in turn drives said mechanism clear of the normally closed stopping switch 58, the motor continuing in action until either the automatic stopping switch 58 is opened by the mechanism referred to or the emergency stopping switch 59 is opened by the operator.

The mechanism referred to, for opening the stopping switch 58, and, by passing therefrom, permitting it to close, comprises a vertical timing shaft 60 journaled in the base portion of the hollow bracket 27 and adapted to be driven, counter-clockwise as viewed in Figs. 6 and 7, through one revolution during the building of each tire, from the core-driving shaft 11, through a worm gear 61 (Fig. 3) meshed with a worm on said shaft 11; a vertical shaft 62 on which said worm gear is secured; a spur gear 63 secured on the upper end of said shaft 62; and a spur gear 64 meshed with the gear 63 and secured upon the shaft 60.

Rotatably mounted upon said shaft 60 is a switch-actuating member 65 having the form of a sector of a circle, said member being provided with bolt holes $65^a$, $65^a$ adapted selectively to receive a bolt 66 mounted in an arm 67 secured to said shaft, so that said member may be secured by said bolt in adjusted angular positions with respect to said shaft. Journaled on said member, at its arcuate outer margin, are rollers 68, 69, 70, 71 (Figs. 6 and 7) adapted, by rolling over the end of the push-button or pin $58^a$ of the stop switch 58, successively to open said switch and so successively to stop the core-driving motor 23 at determinate times in its series of revolutions incident to the building of each tire.

For charging the upper ends of the cylinders 28, 29 while exhausting their lower ends, through the four-way valves 50 and 55 respectively, the valve 55 is provided with an operating lever $55^a$ to the outer end of which is hinged one end of a push rod $55^b$ having its other end portion slidably projecting through the front wall of the hollow bracket member 27 and provided outside of said wall with a stop collar $55^c$ (Fig. 2), adapted to abut said wall; and the valve 50 is provided with a similar actuating lever $50^a$ hinged to a push rod $50^b$ slidably extending through the wall of said bracket member, over and parallel to the rod $55^b$, and provided outside of said wall with a stop collar $50^c$ and a hand knob $50^d$, (Fig. 2). Secured upon the lower push rod, $55^b$, is a collar $55^x$ and secured to the upper push rod, $50^b$, is a downwardly projecting arm $50^x$, having a forked outer end straddling the push rod $55^b$ and adapted to engage the collar $55^x$ thereon to compel the lower rod $55^b$ to move inward, to actuate the lower valve 55, when the upper rod $50^b$ is so moved to actuate the upper valve 50, in the simultaneous charging of the upper ends of both of the cylinders 28, 29, but to leave said collar when the upper rod $50^b$ is subsequently moved outward, in the return movement, whereby the cylinder 29 is reversed while the cylinder 28 for the time being remains charged at its upper end.

For reversing the valve 50, and so moving the upper push-rod $50^b$ outward, at the proper time in the series of tire building operations, to lift the bead-region tire tools 46, 47 while leaving the crown-region tools 35, 37 in operative position, a contact arm $50^y$ is secured to the shaft 60 and adapted to strike a finger $50^z$ projecting from the hub of the valve lever $50^a$ and thereby actuate the valve so as to charge the lower end of the cylinder 29 and exhaust its upper end. For subsequently actuating the valve 55, to lift the tire tools 35, 37, a contact arm $55^y$ is secured to said shaft 60 and adapted to strike a finger $55^z$ on the hub of the valve lever $55^a$.

As shown in Fig. 3, a dial 72 is secured on the outside of the hollow bracket member 27 and provided with a hand or indicator 73 driven by bevel gears 74, 75 from the timing shaft 60, so that the operator may readily ascertain the position of said shaft on occasion, as when the clutch mechanism $19^a$ has been freed and the core turned by hand to free it of a defective piece of work.

In the operation of the apparatus described, assuming the tire core 13 to be mounted upon the chuck 12 and at rest, and the roller 68 (Figs. 6 and 7), to be in contact with the push button $58^a$ and so holding the switch 58 open, such being its position between the building of successive tires, the operator attaches the forward end of the "leader" $15^a$, as shown in Fig. 1, to the core 13, which latter, as mounted upon the chuck, carries a coating of cement to cause the leader and subsequently the tire fabric to adhere thereto. The operator then momentarily closes the starting switch 57, whereupon the motor 23 drives the core and the several mechanisms described. The roller 68 passing from the switch button $58^a$, the switch 58 closes as the switch 57 is permitted to reopen, and the mechanisms continue to be driven until the roller 69 opens the switch 58 and so brings the entire mechanism again to a stop. In this relatively short movement, the rotation of the core draws the liner $15^a$ onto itself and also the leading end of the tire fabric 15 attached thereto, and during this movement the tire tools are all held in their uppermost or inoperative positions, the lower ends of their cylinders being charged.

The operator then removes the "leader" from the core, leaving the leading end of the tire-fabric attached to the core, and pushes in the rod 50$^b$, whose projecting arm 50$^x$, contacting the collar 55$^x$, takes the rod 55 with it, thereby reversing the valves 50, 55 and lowering all of the tire tools into operative position. As the contact arms of the bell crank levers such as 41$^b$, 42$^b$ (Fig. 8) contact their respective stop members, 34$^b$, 44$^b$ or 45$^b$, the associated tire tools of each pair are swung toward each other against the work, and so held in pressing engagement therewith so long as the upper ends of the respective cylinders remain charged. Said stop members being pivotally mounted as described the pressures of the tools of each pair against the work are automatically equalized or balanced against each other.

The operator then closes the switch 57 again, momentarily, whereupon the machine is driven by the motor 23, the roller 69 passing from the switch 58 and permitting the latter to close, until the roller 70 reopens said switch. During this movement the rotation of the core draws thereonto the under-the-bead plies of the tire and the tire tools progressively press them in place. Just before the motor is so stopped by the roller 70, the contact arm 50$^y$ strikes the finger 50$^z$, reversing the valve 50 so as to lift the bead-region tools 46, 47 to their inoperative position, out of the way of the bead placing operation, while leaving the cylinder 28 charged at its upper end, through the valve 55.

The bead placing operation is then performed while the core is at rest, with the roller 70 holding the switch 58 open. The beads may be mounted and rolled in place by means of the apparatus above referred to and shown at 25 (Fig. 2), and by similar but hand operated apparatus at the front side of the tire.

The bead placing operation being completed, the operator again momentarily closes the switch 57, the machine then being driven until stopped by the roller 71 opening the switch 58. During this movement the over-the-bead plies are drawn onto the core by the latter's rotation and pressed or "stitched" in place at the crown of the core by the tools 35, 37, and in the bead regions by other instrumentalities not shown, such for example as are described in my copending application Serial No. 619,648, filed February 17, 1923, Patent Number 1,592,871 July 20, 1926. Just before the motor 23 is stopped by the roller 71, the contact arm 55$^y$ strikes the finger 55$^z$, actuating the valve 55 to reverse the cylinder 28 and thereby raise the crown-region tools 35, 37 to their inoperative position.

The incorporation of the fabric plies into the tire being thus completed, the fabric is detached from the leader of the next tire strip, and the tread may be applied and rolled or "stitched" in place, the machine being started as before, while the timing shaft 60 (Figs. 6 and 7), makes the part of a revolution represented by the departure of the roller 71 from, and the arrival of the roller 68, at the stop switch 58, the lower ends of both of the cylinders 28 and 29 remaining charged during this movement. It will be understood that as the valves 50 and 55 are in succession operated as above described by the contact arms 50$^y$, 55$^y$ respectively, the push rods 50$^b$, 55$^b$ will in succession be thrust back toward the operator, so that when the machine is stopped by the roller 68 all parts are as they were assumed to be in the beginning of the statement of operation. The core with the finished tire thereon is then removed from the chuck, another cemented core substituted therefor, and the operation as described is repeated.

The apparatus is rapid and accurate in operation, a minimum of effort is required upon the part of the operator, the machine being largely automatic, the tire tools are given an inoperative position above the tire core, where they are well out of the way of other instrumentalities and of the operator, and the other advantages set out in the statement of objects above are accomplished.

I claim:

1. Tire-building apparatus comprising means for rotatably supporting a tire-core, a tire-core thereon, a tire-tool, a mounting therefor adapted to be moved toward the tire-core in a direction substantially parallel with the plane thereof, to project the tire-tool inward past the crown of the core without contact of the tire-tool with the work, a contact member, and tool-actuating means on the said mounting adapted to coact with said contact member to introduce the tire-tool to the work from the side of the core after the tire-tool has been so projected past the crown of the core.

2. Tire-building apparatus as defined in claim 1 and including yielding means adapted to hold the tire-tool clear of the work while the tire-tool is projected past the crown of the core, the said yielding means being adapted to be overcome by the force of the contact member.

3. Tire-building apparatus comprising means for rotatably supporting a tire-core on a horizontal axis, a tire-core thereon, a tool-carriage slidably mounted for movement from and toward the tire-core in a plane substantially parallel with the plane thereof, a pair of tire-tools movably mounted on said tool-carriage and adapted to work on opposite sides of the core, and means adapted to cause the tire-tools, in the inward movement of the tool-carriage, to stand apart, out of contact with the work while they are projected inward past the crown of the core and then to be brought into contact with the work from the sides thereof.

4. Tire-building apparatus as defined in claim 3 in which the tool-carriage is mounted above the tire-core for vertical sliding movement from and toward the same.

5. Tire-building apparatus as defined in claim 3 in which the tool-carriage and its mounting and the tool-actuating means are so constructed and associated that the tire-tools operate upon the work only at fixed positions radially thereof.

6. Tire building apparatus comprising means for rotatably supporting a tire core, a tire core thereon, a tool carriage slidably mounted for movement, substantially in the extended plane of said core, from and toward the core, a pair of tire tools mounted on said carriage, and adapted to operate on opposite sides of the tire core, a contact member mounted adjacent said core and adapted, through movement of the tool carriage with relation thereto, to move said tools toward each other so as to present them to the work from the side thereof as said carriage approaches the core, without contact of the tools with the work at the crown of the core, and yielding means urging said tools apart and adapted to be overcome by the pressure of said contact member.

7. Tire building apparatus comprising means for rotatably supporting a tire core substantially in a vertical plane, a tire core thereon, a tool carriage mounted over said core for movement from and toward the same, a tire tool on said carriage, and means for moving said tire tool laterally of the core, with relation to said carriage, as the latter is raised and lowered, to cause said tool to clear the bulge of the core and bear upon the work below said bulge.

8. Tire building apparatus comprising means for rotatably supporting a tire core substantially in a vertical plane, a tire core thereon, a tool carriage mounted over said core for movement toward and from the same, a pair of tire tools on said carriage adapted to operate at the opposite sides of said core, yielding means urging said tools apart laterally of the core, and contact means adapted to close said tools together upon the work presenting them from the sides thereof, as said carriage approaches the core.

9. Tire building apparatus comprising means for rotatably supporting a tire core, a tire core thereon, a tool carriage mounted for movement from and toward said core, substantially in the extended plane thereof, a pair of tire tools mounted on said carriage and adapted to operate at the opposite sides of said core, yielding means for urging said tools apart and a pivoted contact member mounted adjacent said core and adapted, by movement of said carriage with relation thereto, to press said tools against the work, but only after the tools have passed the crown of the core without contacting the work thereon, said pivoted contact member being adapted approximately to equalize the pressure of said tools upon the work.

10. Tire building apparatus comprising means for rotatably supporting a tire core, a tire core thereon, a fluid pressure cylinder mounted to act in a direction substantially radial of said core, a slidably mounted tool carriage adapted to be moved from and toward said core by said cylinder, a pair of tire tools pivotally mounted on said carriage and adapted to operate at the respective sides of said core, yielding means urging said tools apart, and contact means adapted to force said tools toward each other, against the work, but only after the tools have passed the crown of the core without contacting the work thereon, as said carriage is moved toward said core.

11. Tire building apparatus comprising means for rotatably supporting a tire core, a tire core thereon, a fluid pressure cylinder disposed substantially in the extended plane of said core, a guiding structure projecting from said cylinder toward said tire core, a tool carriage structure slidably mounted on said guiding means and adapted to be moved toward the work by direct action of said cylinder, a tire-tool mounted on said carriage, and a contact member mounted on said guiding structure and adapted to force said tire-tool laterally of the core, against the work, through movement of said carriage on said guiding structure, but only after the tools have passed the crown of the core without contacting the work thereon.

12. Tire building apparatus comprising means for rotatably supporting a tire core, a tire core thereon, a pair of tool carriages adapted to be moved from and toward said core substantially in the extended plane thereof, means for driving said core, means for moving said tool carriages from the tire core at different, determinate times with relation to the rotation of the core, tire-tools mounted on said carriages, one of said tools being movably mounted thereon, and means for moving said tool laterally of the core as its carriage moves with relation to the core.

13. Tire building apparatus comprising means for rotatably supporting a tire core, a tire core thereon, a pair of tool carriages adapted to be moved from and toward said core substantially in the extended plane thereof, means for driving said core, means for moving said tool carriages from the tire core at different, determinate times with relation to the rotation of the core, tire tools mounted on said carriages, one of said tools being movably mounted thereon, yielding means for holding said tool clear of the work as its carriage approaches the core, and a contact member adapted to force said tool laterally against the work through further movement of said carriage toward the core.

14. Tire building apparatus comprising means for rotatably supporting a tire core, a tire core thereon, a pair of fluid pressure cylinders disposed substantially in the extended plane of said core, a tire tool adapted to be presented to and withdrawn from the work by the action of the first of said cylinders, and to operate adjacent the crown portion of the core, a tire tool adapted to be presented to and withdrawn from the work by the action of the second of said cylinders, and to operate adjacent the bead portion of the core, means for driving said core, and timing mechanism operatively connected with said core driving means and adapted to actuate said cylinders at determinate times with relation to the rotation of said core.

15. Tire building apparatus comprising means for rotatably supporting a tire core, a tire core thereon, a tool carriage mounted for movement into and out of an operative position fixed with relation to the orbit of the core, a tire tool thereon, means for driving said core, and means operatively connected with said core driving means for withdrawing said carriage from the work at a determinate time with relation to the rotation of said core.

16. Tire building apparatus comprising means for rotatably supporting a tire core, a tire core thereon, a tool carriage, a tire tool thereon, a fluid pressure cylinder adapted to move said carriage into and out of an operative position fixed with relation to the orbit of said core, a valve device through which the respective ends of said cylinder are adapted to be alternately charged, means for driving said core, and means actuated by said core-driving means for reversing said valve device at a determinate time with relation to the rotation of said core.

17. Tire building apparatus comprising means for rotatably supporting a tire core, a tire core thereon, a pair of tool carriages mounted for movement from and toward said core, means adapted to present said carriages to said core, means for driving said core, and means timed with said core-driving means for successively retracting said carriages from the core.

18. Tire building apparatus comprising means for rotatably supporting a tire core, a tire core thereon, a tool carriage, means for moving the latter into and out of an operative position fixed with relation to the orbit of said core, means for driving said core, and timing means actuated by said core driving means for stopping the latter and actuating said carriage moving means.

19. Tire building apparatus comprising means for rotatably supporting a tire core, a tire core thereon, a fluid pressure cylinder adjacent said core, a tire tool adapted to be moved by said cylinder with relation to said core, a control valve for said cylinder, means for driving said core, a timing shaft driven by said core-driving means, means on said timing shaft for actuating said control valve, and means on said timing shaft for stopping said core driving means.

20. Tire building apparatus comprising means for rotatably supporting a tire core, a tire core thereon, a tool carriage mounted for movement from and toward said core, a tire tool thereon, means for driving said core, a timing shaft driven by said core-driving means, means on said timing shaft for effecting movement of said carriage, and means on said timing shaft for stopping said core-driving means.

21. Tire building apparatus comprising means for rotatably supporting a tire core, a tire core thereon, a tool carriage mounted adjacent said core, means for driving said core, means for moving said carriage, a timing device driven by said core-driving means and adapted to control said carriage-moving means, and a dial indicator driven by said core-driving means.

22. Tire building apparatus comprising means for rotatably supporting a tire core, a tire core thereon, a tool mounting adapted to be moved substantially in the extended plane of the core, into and out of a fixed operative position, a tire tool mounted thereon, and means adapted, through movement of said carriage toward the core, to introduce the said tool to the work initially from the side of the core.

23. Tire building apparatus comprising means for rotatably supporting a tire core, a plurality of tool carriages mounted adjacent said core and adapted to be moved, radially of the core, from and toward the same, tools on said carriages adapted to operate upon a tire structure on said core, means for moving the respective carriages from and toward the core in determinate relation as to time, and means for moving the tools, on said carriages, into and out of operative position, in determinate relation as to time, the structure being such that the tools clear the crown of the core without contacting the work thereon and operate only at the sides of the core.

In witness whereof I have hereunto set my hand this 8 day of March, 1923.

MERLE C. SCROTE.